Jan. 10, 1956 — V. OSWALT — 2,730,252
MATERIAL HANDLING APPARATUS
Filed Oct. 8, 1952 — 3 Sheets-Sheet 1

INVENTOR.
VICK OSWALT
BY
Jennings & Carter
ATTORNEYS

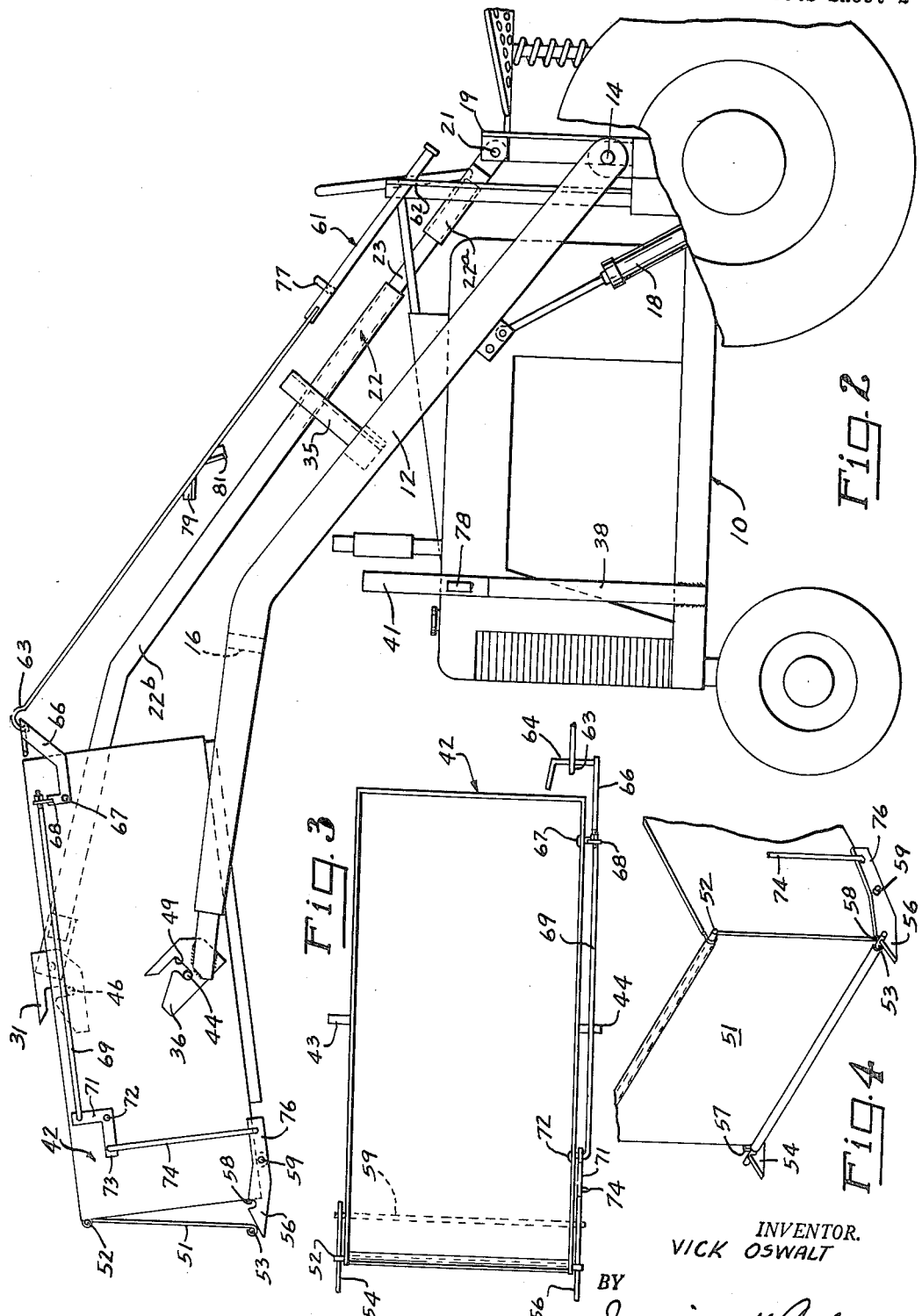

INVENTOR.
VICK OSWALT
BY
Jennings & Carter
ATTORNEYS

United States Patent Office 2,730,252
Patented Jan. 10, 1956

2,730,252

MATERIAL HANDLING APPARATUS

Vick Oswalt, Clermont, Fla.

Application October 8, 1952, Serial No. 313,760

10 Claims. (Cl. 214—304)

This invention relates to material handling apparatus, and particularly to apparatus for handling material receptacles and includes means for detachably engaging, raising and emptying such receptacles.

While not so limited my improved apparatus has particular usefulness in the harvesting of citrus fruits. As is well known in the art to which my invention relates citrus fruit groves thrive in loose sandy soil and the trees may grow and spread until the branches practically overlap between rows. These conditions make it impossible for a motor driven truck to go through a grove and load the boxes of fruit as they are picked. It is the practice with which I am acquainted to park a large truck or trailer on a hard road as near as possible to the picking operation and convey the boxes to the trailer by various means and load them into the trailer. This operation has entailed considerable labor and expense which often turns what would otherwise be a profitable grove operation into a loss.

In accordance with my invention I may conveniently utilize a tractor vehicle such as is usually employed in the cultivation of citrus groves and which is equipped with a pair of hydraulically operated lifting arms. I provide a plurality of relatively large receptacles each capable of holding around 20 boxes of fruit and place them in the grove convenient to the pickers.

The tractor lift arms are provided with means for detachably engaging the receptacles whereby to raise and transport them to the waiting truck or trailer and there raise them further for emptying into the trailer. In addition I provide means on the tractor in convenient reach of the operator to maintain the receptacles level while being transported and to tilt them for unloading. There is also provided a hinged end on each of the receptacles with a latch which may be tripped from the tractor for emptying the receptacle. All of these operations may be carried out by one man seated on the tractor, thereby greatly reducing the time and labor heretofore required.

Other features of my invention reside in the details of construction and operation of the various parts; in the provision of improved guide means for steadying the lifting arms; and in the provision of a trip rod on the tractor which engages with the latch mechanism on a receptacle when it is raised and disengages when it is lowered.

The foregoing and other important features of my invention are illustrated in the accompanying drawings forming a part of this application in which:

Fig. 2 is a view similar to Fig. 1 taken from the opposite side, showing the lift arms in raised position and the receptacle partially tilted;

Fig. 3 is a plan view of a receptacle;

Fig. 4 is a perspective view of the hinged end of the receptacle;

Figure 1:
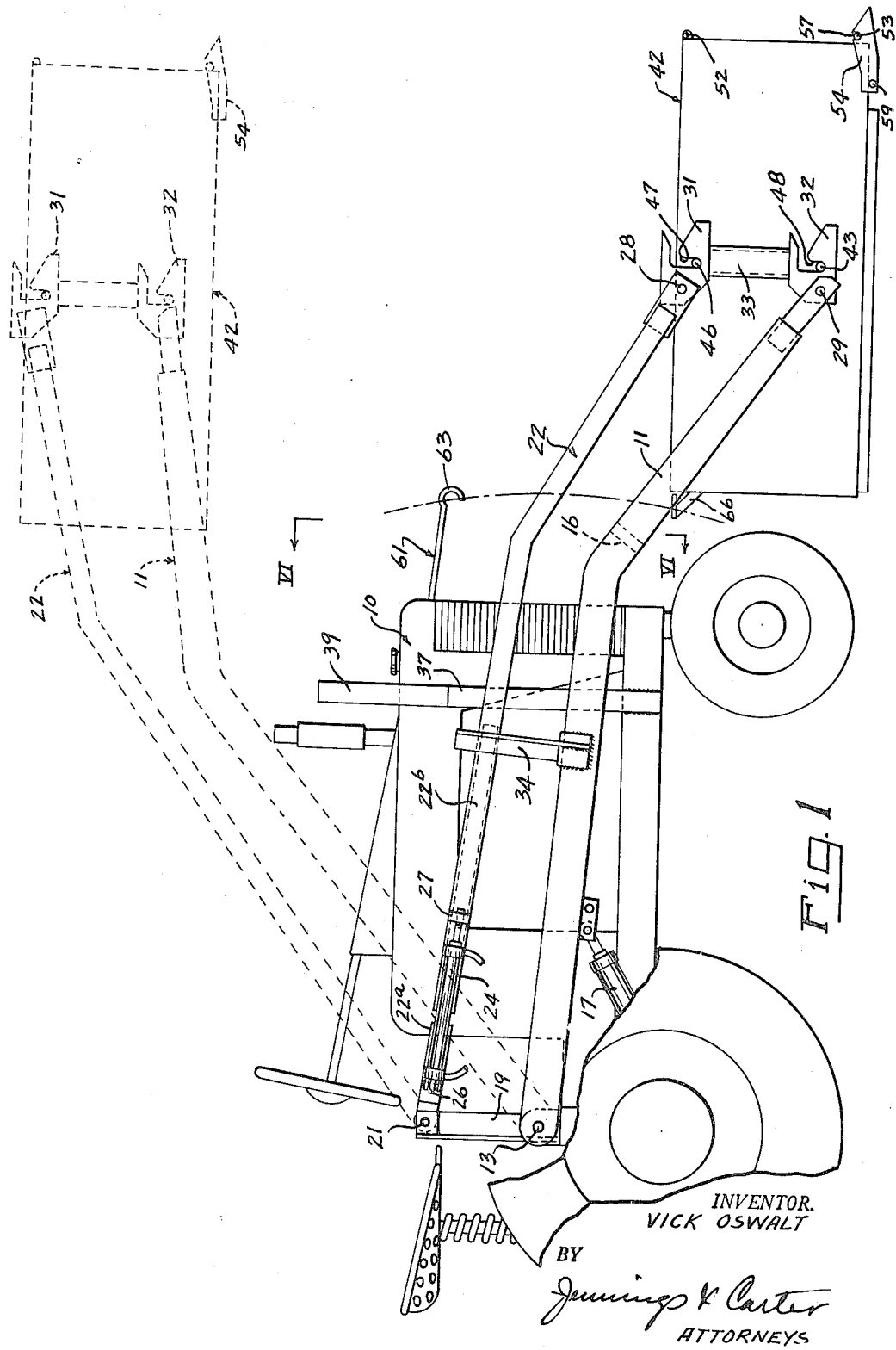
Fig. 1 is a side elevational view showing the tractor vehicle and receptacle, and showing, in dotted lines, the lift arms raised.
Figure 6:
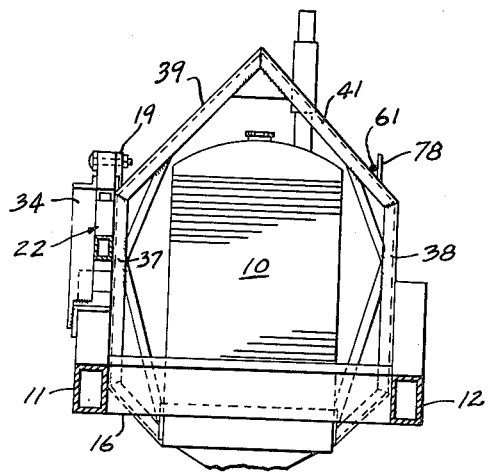
Fig. 6 is a sectional view taken along the line VI—VI of Fig. 1.
Figure 5:
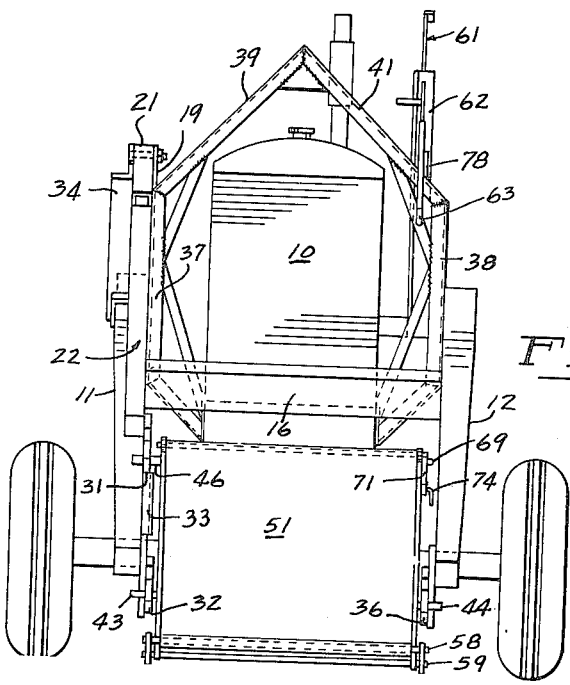
Fig. 5 is a front view of the apparatus.

Referring to the drawings for a better understanding of my invention I show in Figs. 1, 2 and 5 a tractor vehicle 10 having lift arms 11 and 12 which are pivoted to the frame of the vehicle at 13 and 14. The arms 11 and 12 are joined together by a cross member 16 and may be raised and lowered by means of hydraulic cylinders 17 and 18 in a manner well understood.

Figure 7:
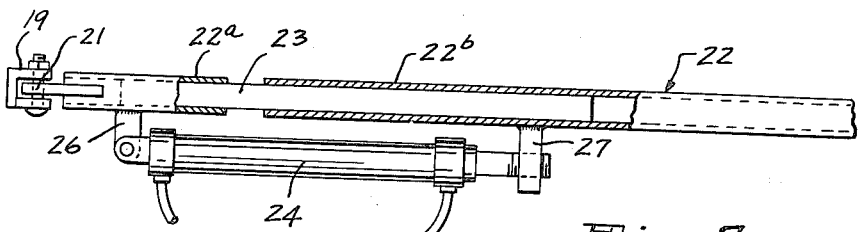
Fig. 7 is a fragmentary plan view partly in section, of the leveling and tilting arm.

Rigidly mounted on the tractor 10 and extending upwardly above the rear of the arm 11 is an upright member 19 to which is pivotally connected at 21 a tilting and leveling arm 22. The tilting and leveling arm 22, as shown in Fig. 7, is comprised of two hollow sections 22a and 22b. A stiffening member 23 is welded or otherwise rigidly secured in the section 22a, while the section 22b is adapted to slide outwardly and inwardly with respect to said member 23. A hydraulic cylinder 24 is connected at one end to a bracket 26 on the section 22a and to a bracket 27 on the section 22b whereby to extend or retract the section 22b and thereby elongate the leveling and tilting arm 22. At their forward ends, the lifting arm 11 and the leveling and tilting arm 22 are both pivotally connected, as shown at 28 and 29, to forwardly opening hook members 31 and 32, which, in turn, are rigidly connected to a common connecting member 33. The member 33 maintains the hook members in a fixed spaced relation and causes the arms 11 and 22 to move together. Mounted on the arm 11 are guide members 34 and 35 between which the arm 22 is adapted to move and which serve to stabilize the arm in its operations. The forward end of the arm 12 is provided with a forwardly opening receptacle-engaging hook 36 rigidly mounted thereon which is similar to, and directly opposite, the hook 32 at the outer end of the lift arm 11. It will be seen that when the lift arms 11 and 12 are in their lowered positions, the hook 36 will assume a position corresponding to and directly opposite that of the hook 32.

In order to prevent side sway of the arms 11 and 12 when transporting a load, I provide a guide frame having side members 37 and 38 rigidly secured to the tractor frame and which engage the arms 11 and 12 when raised a short distance off the ground as when transporting a load. The members 37 and 38 are joined at their upper ends by two members 39 and 41 which are joined together at their upper ends in the form of an inverted V to guide the arms 11 and 12 in their downward movement after having been raised to their uppermost position.

In accordance with my invention I provide a rectangular, or box like material-handling receptacle 42 of a size to fit between the lift arms 11 and 12 and capable of holding some 20 boxes of citrus fruits. The receptacle 42 is provided on its sides midway between its ends with lift pins 43 and 44 each of which is located below the center of gravity of the receptacle. On the side of the receptacle 42 to be engaged by the tilting arm 22, I provide a leveling and tilting pin 46 which is directly above the pin 43 and spaced therefrom a distance equal to the distance between the hook members 31 and 32. It will be seen that when the receptacle 42 is resting on the ground, as shown in Fig. 1, the pins 43, 44 and 46 may be engaged by the arms 11, 12 and 22, by a forward movement of the arms. The hooks 31 and 32 are provided with downwardly opening slots 47 and 48 respectively and the hook member 36 is provided with a downwardly opening slot 49 whereby, when the pins 43, 44 and 46 have been engaged by their hook members 32, 36 and 31, respectively, and the arms are moved upward slightly, the said pins are engaged with the hook members and held against accidental displacement.

In order that the receptacle 42 may be readily emptied, I hinge one end, as shown at 51, by means of a pivot rod 52 which extends entirely across that end of the receptacle so that the end 51 may swing outwardly as shown in Fig. 3. Extending across the lower edge of the end 51 is a rod 53 which engages with notches 57 and 58 provided in latch members 54 and 56 when the receptacle is closed as shown in Figs. 1 and 4. The latch members 54 and 56 are rigidly mounted on a cross rod or shaft 59 which extends across beneath the receptacle 42.

The latch members 54 and 56 may be tripped by means of a trip bar 61 which is slidingly mounted in a guide member 62 mounted on the tractor. The forward end of the trip rod 61 is provided with a hook 63 which opens downwardly and which is adapted to engage with a bracket 64 mounted on the arm 66 of a bell crank lever which is pivoted to the receptacle 42 at 67. An upwardly extending arm 68 of the bell crank lever is connected to a horizontal rod 69 which, in turn, is connected to the upper arm 71 of a bell crank lever pivoted at 72 on the receptacle 42. The forwardly extending arm 73 of the bell crank lever is connected to a link 74 which, in turn, is connected to an arm 76 of the latch member 56, whereby when a rearward pull is exerted on the trip rod 61, an upward pull on the link 74 is effected which disengages the latch members 54 and 56 from the rod 53 on the end member 51. The trip rod 61 is manipulated by means of a handle 77 provided thereon. In order to disengage the trip rod hook 63 from tthe bracket 64, I mount a bracket 78 on the guide member 41 which, when the receptacle 42 is lowered engages the trip rod 61 and holds it out of engagement with the bracket 64, as the receptacle 42 is lowered, at the position indicated in Fig. 1 of the drawing. A pair of small bracket members 79 and 81 mounted on the rod 61 engage with the guide member 78 and restrain the rod against turning as well as serving to hold it in the proper position to engage with the bracket 64 when the receptacle is again raised.

From the foregoing description, the operation of my improved apparatus will be readily understood. A plurality of receptacles 42 are distributed through a grove being picked convenient to the pickers. When a receptacle is filled, the tractor is moved forward with its lift arms and leveling and tilting arm lowered in position to engage with the pins 43, 44 and 46. The pins are readily received in the forwardly opening hooks 31, 32 and 36, whereupon the receptacle is lifted by raising the lift arms 11 and 12 by means of the hydraulic cylinders 17 and 18. The pins 43, 44 and 46 rest, respectively, in the downwardly opening notches 48, 49 and 47 so that the receptacle does not become displaced. For transporting through the grove, the receptacle is raised only a short distance above the ground and is maintained in a level position by means of the arm 22. While being transported, side sway of the lift arms 11 and 12 is restrained by means of the guide members 37 and 38. When the unloading point is reached, the lift arms 11 and 12 and the receptacle 42 are raised to the position shown in Fig. 2 of the drawing. As the receptacle is raised, the hook 63 on the trip rod 61 engages the bracket 64 on the bell crank lever 66. When ready to empty the receptacle, the rod 61 is pulled by means of the handle 77 which results in tripping the latch members 54 and 56 in a manner already described, whereupon the contents of the receptacle are discharged. Hydraulic fluid is then admitted to the cylinder 24 in a manner well understood to extend the arm 22 and tilt the receptacle 42 to empty it. The receptacle is then leveled by retracting the arm 22 and may be lowered and reconveyed to a point convenient to the pickers. The tractor is then ready to pick up, transport and empty another receptacle.

From the foregoing it will be apparent that I have devised an improved material handling apparatus which is of simple design, economical of manufacture, and reliable in operation, and one which greatly reduces the time, labor and expense of harvesting citrus fruits.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In combination with a tractor vehicle having forwardly extending power actuated lift arms, a dump box having lift pins on opposite sides thereof intermediate its ends and below its center of gravity, lift hooks on the lift arms adapted to engage and disengage the lift pins, a third pin on one side of the box located above its associated lift pin, an extensible leveling arm on the tractor extending forwardly above one of the lift arms, a hook carried by the leveling arm and adapted to engage and disengage the third pin, power actuated means operable from the tractor to extend and retract the leveling arm to vary the relation of the box to the horizontal, a door pivoted at one end of the box, a latch for the door and means operable from the tractor for operating the latch to open the door.

2. In combination with a tractor vehicle having a pair of forwardly extending power operated lift arms, a material handling receptacle of a width to fit between the arms, a lift pin extending outwardly from each side of the receptacle intermediate its ends, a forwardly opening hook member at the forward end of each lift arm adapted to engage the lift pin by a forward and upward movement when the receptacle is in its lowered position, a third pin extending outwardly from one side of the receptacle above the lift pin on that side, a power operated leveling arm mounted on the tractor and extending forwardly therefrom over one of the lift arms, a forwardly opening hook member at the forward end of the leveling arm in position to engage the third pin by a forward and upward movement when the receptacle is in its lowered position, and power means for extending and retracting the leveling arm to dump the receptacle and then level it while in raised position.

3. Apparatus as defined in claim 2 in which the lift arm on one side of the receptacle and the leveling arm on that side are pivoted at their outer ends to a common connecting member and in which the forwardly opening hooks are rigidly joined to the connecting member in position to engage and disengage the lift pin and third pin on that side when the receptacle is in lowered position.

4. Apparatus as defined in claim 2 in which the forwardly opening hook for engaging the lift pin on the side of the receptacle opposite the third pin is rigidly joined to the lift arm on that side.

5. Apparatus as defined in claim 2 in which the receptacle has one end pivoted at the top to swing open, a latch for holding that end in closed position, latch tripping mechanism on the receptacle, and a trip rod on the tractor operable therefrom and extending forwardly from the tractor in position to engage the trip mechanism when the receptacle is raised.

6. In a tractor vehicle having a pair of forwardly extending power operated lift arms, an extensible leveling arm carried by and extending forwardly from the tractor above one of the lift arms, a material handling receptacle, pins on the receptacle, forwardly opening hook members at the outer ends of the lift arms and leveling arm engageable and disengageable with said pins by a forward and upward movement and a downward and backward movement respectively of the tractor, said forwardly opening hook members each having a downwardly opening slot for engaging and retaining its associated pin in the hook member, and a double acting fluid operated cylinder operable to extend and retract the leveling arm to dump and level the receptacle when in raised position.

7. Material handling equipment comprising a pair of power operated lift arms disposed in side by side spaced relation, a receptacle disposed between the lift arms and having laterally extending lift pins on its sides below its center of gravity, an extensible tilting and leveling arm on one side of the receptacle above and parallel to the lift arm on that side, a laterally extending tilting pin on the receptacle in position to be engaged by the tilting and leveling arm on one side of the receptacle above the lift pin on that side, means for detachably engaging the lift arms with the lift pins and the tilting and leveling arm with the tilting pin by a forward and upward movement, and a double acting fluid cylinder mounted on the tilting arm operable to extend and retract said arm.

8. Apparatus as defined in claim 7 in which the means for detachably engaging the lift arms and the leveling arm with their respective pins comprises hooks mounted at the outer ends of said arms engageable by a forward and upward motion and detachable by a downward and rearward motion.

9. Material handling equipment comprising a pair of power operated lift arms disposed in side by side spaced relation, a receptacle disposed between the lift arms and having laterally extending lift pins on its sides below its center of gravity, a laterally extending tilting pin on one side of the receptacle above the lift pin on that side, an extensible tilting and leveling arm mounted above and movable with one of the lifting arms, means for engaging and disengaging the lift arms with the lift pins and the tilting and leveling arm with the tilting pin, and double acting power means to elongate and retract the tilting and leveling arm to vary the position of the receptacle when in raised position with respect to the horizontal.

10. Apparatus as defined in claim 9 in which the tilting and leveling arm and the lifting arm on that side are pivoted at their outer ends to a common connecting member and the means for engaging and disengaging said arms comprises forwardly opening hook members rigidly mounted on said connecting member, and wherein the means for engaging and disengaging the other lift arm with its lift pin comprises a forwardly opening hook member rigidly secured to said other lift arm.

References Cited in the file of this patent

UNITED STATES PATENTS

| | | |
|---|---|---|
| 1,628,389 | Cochran | May 10, 1927 |
| 1,753,756 | Small | Apr. 8, 1930 |
| 2,304,649 | McDaniels | Dec. 8, 1942 |
| 2,348,899 | Guignard et al. | May 16, 1944 |
| 2,458,195 | Pearse | Jan. 4, 1949 |
| 2,626,070 | Ezell et al. | Jan. 20, 1953 |
| 2,672,995 | Drott | Mar. 23, 1954 |